Nov. 10, 1953      H. R. TALMAGE      2,658,240
DISPENSING APPARATUS

Filed May 31, 1946      3 Sheets-Sheet 1

HOMER R. TALMAGE
INVENTOR.

BY Edmund W.C. Kamm

Nov. 10, 1953  H. R. TALMAGE  2,658,240
DISPENSING APPARATUS
Filed May 31, 1946  3 Sheets-Sheet 3
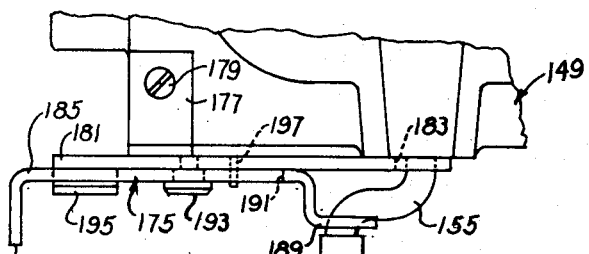
Fig. 3
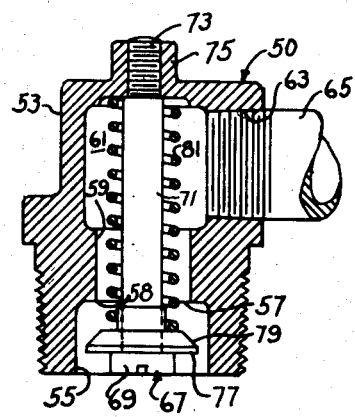
Fig. 5
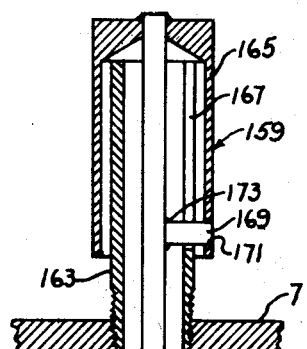
Fig. 4
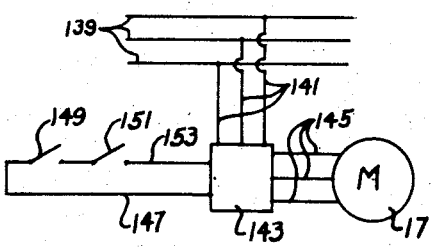
Fig. 6
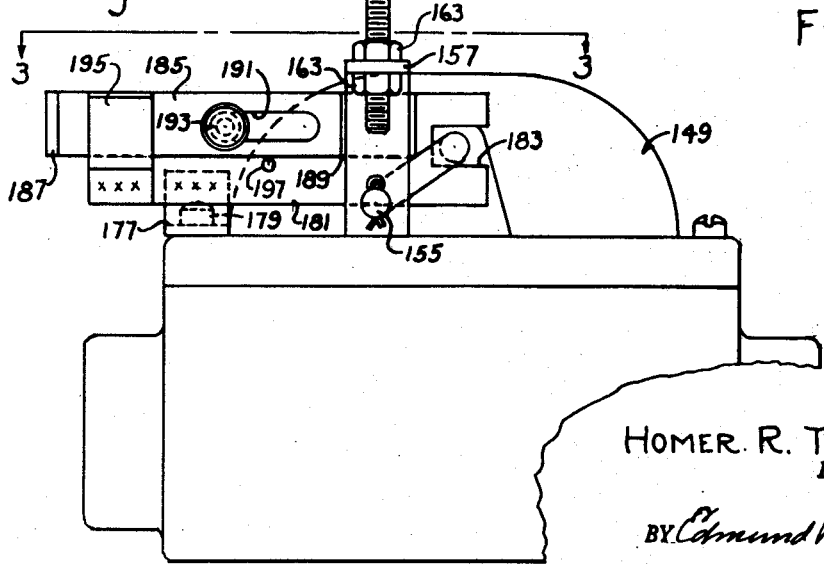
HOMER. R. TALMAGE
INVENTOR.

Patented Nov. 10, 1953

2,658,240

UNITED STATES PATENT OFFICE 2,658,240

DISPENSING APPARATUS

Homer R. Talmage, Fort Wayne, Ind., assignor to Bowser, Inc., Fort Wayne, Ind., a corporation of Indiana Application May 31, 1946, Serial No. 673,395

1 Claim. (Cl. 20—0.8)

This invention relates to a liquid dispensing device, in particular it relates to a device for transferring gasoline and other liquid petroleum products from a bulk storage tank to a truck transport for delivery.

At the present time it is customary practice in building a bulk station to install the tanks, build a pump house in which pumps, motors, starters and other equipment are mounted on suitable bases and foundations. It is also necessary to build a loading platform and mount the meters, hose supports and controls on the platform. All of this represents considerable cost especially when it is necessary to procure carpenters, plumbers, millwrights and other high-priced labor to make the installation.

It is one of the objects of the invention to produce a factory fabricated bulk plant unit which is self contained, that is, it contains within a housing and mounted upon a suitable frame work, the pump, meter, strainer, filter, motor starter and other units necessary to deliver liquid upon being connected to a supply pipe. Furthermore, the platform is built on the housing and provision is made for attaching a ladder or stair thereto so that the operator can easily reach the platform. Where a number of grades of liquid or different liquids are handled, several units may be mounted side by side so that their platforms form a continuous deck from which the required operations may be carried out.

It is an object of this invention to provide a unitary device for transferring the liquid from the tank to the transport.

It is another object of this invention to provide a device for transferring accurately measured liquid from the tank to the transport.

It is still another object of this invention to provide a device for transferring filtered liquid from the tank to the transport.

Yet another object is to provide a combined filtering and air separation mechanism.

It is yet another object of the invention to provide a device for transferring liquid under control of a check controlled predetermined device.

It is yet another object of this invention to provide a device for transferring liquid from a tank to a transport, said device having a platform, the operating controls of the device being elevated to a level with the platform.

It is yet another object of the invention to provide an electrically operated liquid transfer device wherein the motor switch and the discharge nozzle may be locked within the housing.

These and other objects will become apparent from a study of this specification and the drawings which are attached hereto and made a part hereof and in which:

Figure 3 is a plan view of the switch and the switch interlock.

Figure 4 is an elevation of the switch and the switch interlock of Figure 3.

Figure 5 is a sectional view of the filter air separator vent valve.

Figure 6 is a wiring diagram showing the motor, the motor starter, the manual switch, and the switch of the check controlled predetermining mechanism.

Figure 1:
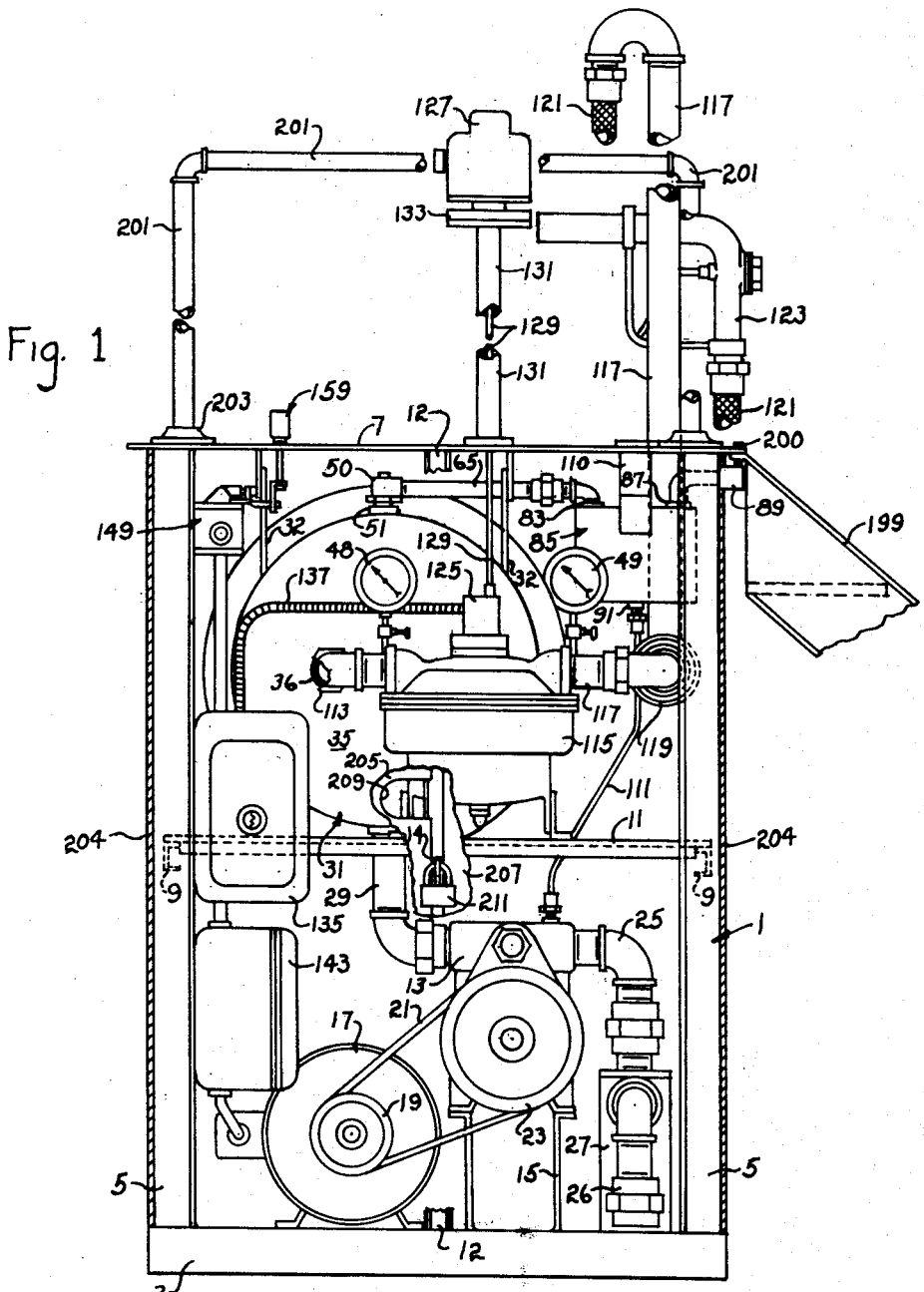
Figure 1 is an elevation from the front or door side of the device with the greater portion of the doors removed.
Figure 2:
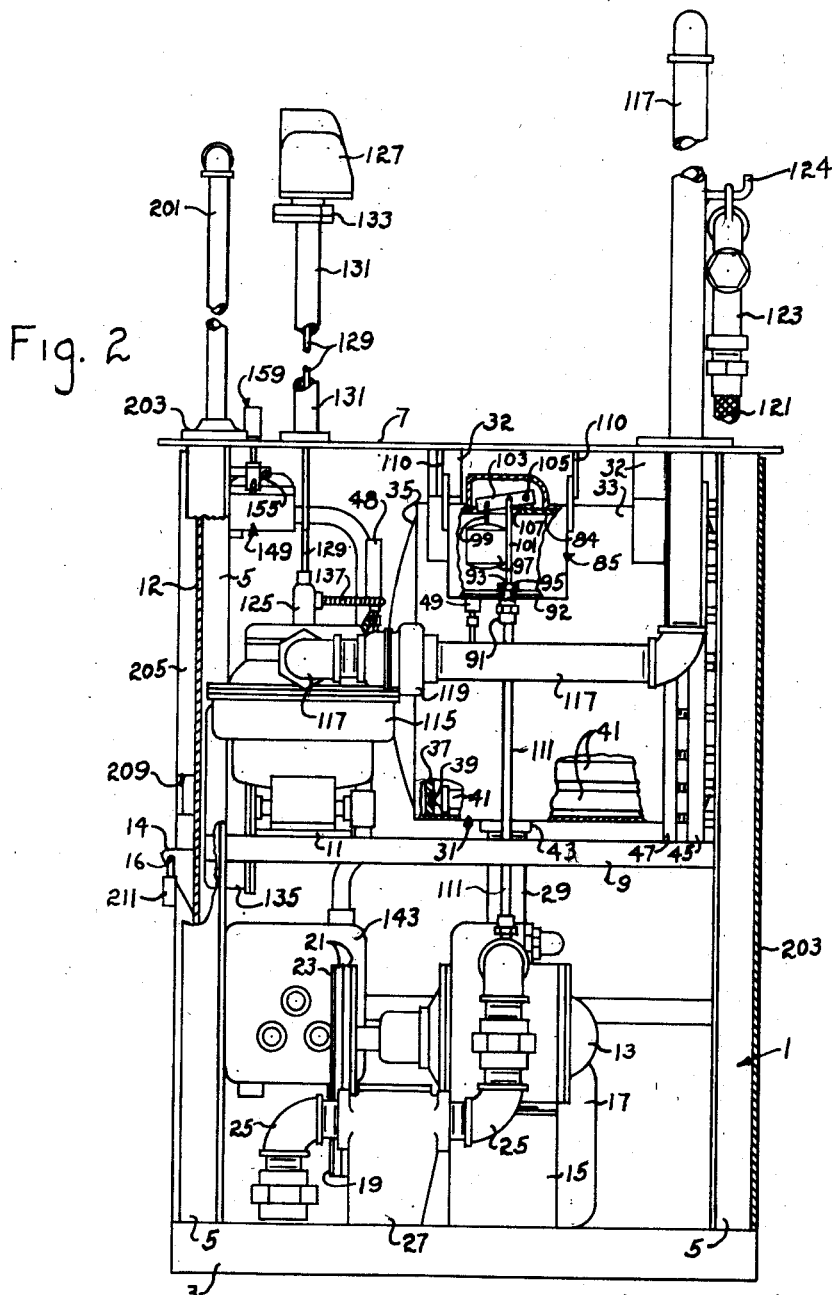
Figure 2 is an elevation of the apparatus of Figure 1 taken from the right with the housing and stair removed.

Referring to Figures 1 and 2 of the drawings the numeral 1 designates a chassis having a substantially square base 3 and uprights 5 joined to the base and supporting a deck plate or platform 7 at each of its four corners.

A crossmember 9 (Figure 2) extends from the front upright 5 to the back upright on each side of the chassis about midway between the base and the deck plate and the ends of a plate 11 rest upon and are fixed to the crossmembers. A channel 12 is welded in the center of the front of the base 3 and to the bottom of the deck plate 7 and carries a lug 14 having a hole 16.

A pump 13 is mounted upon a U-shaped support 15 which is fixed to and rises from the base 3. The pump shown is a rotary positive displacement type with an integral by-pass valve.

The pump is driven by a motor 17, also mounted upon the base, through motor sheave 19, belts 21 and pump sheave 23.

The pump suction inlet is connected through piping 25, and a strainer 27 to the suction connection 26.

The pump discharges through piping 29 into the under side of the combined filter and air separator 31. The filter and air separator comprises a cylindrical shell 33 which is suspended from the deck plate by hangers 32. The shell is fitted with a dished head 35 welded in one end, which head has an outlet coupling 36 and a gauge coupling (not shown) welded into it.

A liquid-tight header 37 is welded into the shell near the head 35. The header has a plurality of tapped holes 39 into which are screwed filter elements 41. The filter elements shown are cylindrical in shape and extend into the inlet side of the shell which is connected to piping 29 by the coupling 43. A removable head 45 is bolted or clamped to a ring 47 welded to the exterior of the shell near the end opposite the head 35. A pressure gauge 48 is piped into the gauge coupling in head 35 and another pressure gauge 49 is piped into the shell on the inlet side.

A valve 50 (Figures 1 and 5) is threaded into a coupling 51 which is welded into the top of the shell on the inlet side. The valve (see Figure 5) is comprised of a body 53, having an inlet 55. A seat 57 which is mutilated as shown at 58 to prevent complete closure of the valve, is formed at the inlet side of passage 59 and a chamber 61 is connected to the passage and to an outlet 63 which receives the pipe 65. A stud 67 has a head 69, a body 71, and a threaded reduced portion 73 which screws into the boss 75 in the body. A valve 77, having a tapered seat 79, slides on the study body, and a spring 81 urges said valve away from its seat.

The pipe 65 connects with a coupling 83 in the top head 84 of the float chamber 85. The float chamber in Figure 2 especially, is cylindrical in shape set with its axis vertical, and has a gas outlet 87 in the top head opening through conduit 89 to the atmosphere, and a liquid outlet 91 in the bottom head 92 having a valve seat 93. A valve 95 is connected to a float 97 by rods 99 and 101 and by lever 103 which is pivoted to the top head at 105. A hole 107 is provided in the top head to afford clearance for the rods and the lever and cover 109 encloses the hole, rods and lever. The float chamber is suspended from the deck plate by hangers 110.

A conduit 111 connects the liquid outlet 91 to the suction side of the pump.

The main outlet line 113 from the filter-separator is connected to coupling 36 and leads into a liquid meter 115 which is fastened to the plate 11. The meter shown is of the positive displacement or volumetric type although any suitable meter may be used. The meter discharges into the conduit 117 which has a check and relief valve 119 to prevent backflow of liquid except under high pressures. The conduit 117 terminates in a hose 121 and a valve controlled nozzle 123. The nozzle may be suspended from a hook 124 welded to the conduit 117 at a convenient height.

A power take-off mechanism 125 having a suitable gear ratio is driven by the meter output shaft (not shown) and in turn drives a register 127 through shaft 129 which extends through a hollow casing 131 and the register mounting plate 133 which is fixed to the top of the tube. The register shown is of the direct reading reset type and has a swivel base. Other registers, printers, predeterminers or combinations thereof may, of course, be used.

The power take off is also used to drive a check controlled predetermining device 135 through a flexible shaft and casing 137. The predetermining device is similar to that disclosed in Patent No. 2,247,480 to Damon, et al. The checks used, however, are preferably smaller in size than those used in filling station pumps and represent greater quantities of liquid. For instance, in filling station work a fifty-gallon token is used whereas the token used in this bulk unit would represent perhaps 250 or 500 gallons. The power take-off gearing must be properly selected for the particular meter used so that the dispensing apparatus will be disabled when the prepaid liquid has been dispensed.

The switch of predetermining device is incorporated into the wiring circuit as shown in Figure 6. The numeral 139 represents the main line having leads 141 into a motor starter 143. Leads 145 connect the starter with the motor 17. The control line 147 has a manually operated switch 149 connected in series with a switch 151 which is a part of the predeterminer 135. Switch 151 connects with line 153 which terminates in the starter. So long as either switch 149 or 151 is open the motor 17 remains deenergized.

The manual switch 149 is mounted on one of the uprights 5 and has an operating lever 155 (see Figures 3 and 4) which is connected to an angle clip 157 which in turn is secured to the switch pedal 159 by means of rod 161 passing through a hole in the angle clip and adjustably secured thereto by nuts 163, one on either side of the clip. The rod 161 passes up through a short pipe 163 which is screwed into a tapped hole in the deck plate from the top. The rod 161 is welded at its top end to a cap 165 which telescopes over the pipe 163. A slot 167 in the pipe provides a guide and a stop for the pin 169 which is fixed to and projects laterally from rod 161 at 173 and which enters a hole 171 near the bottom of the cap. The clip is welded to and supports a guide member 181 having on one end a forked end 183 which passes over the switch operating lever 155 adjacent the point where it enters the switch box and on the other end an upwardly open yoke 195. A locking slide 185 is mounted with its outer end riding in the yoke and has its outer tip 187 bent at right angles to provide a hold for the fingers and has an offset 189 at the opposite end which rides above the outer end of the operating lever 155 when the slide is in locking position. A longitudinal slot 191 is provided approximately midway between the ends of the slide. A shoulder screw 193 enters slot 191 as a guide and also secures the slide to the member 181. A pin 197 is fixed to the member 181 below the slide and to the right of screw 193 to serve as an additional guide for the slide 175.

A stair or ladder 199 is detachably fastened to the deck plate by means of bolts 200. A guard rail 201 is mounted in flanges 203 secured to the deck plate, extends up from the deck along door side of the platform while the opposite or service side is unobstructed so that the operator can mount the tank of the transport whenever necessary.

The chassis 1 is provided with stationary housings 204 on three sides and side hinged doors 205 and 207 on the fourth side. One of the doors is provided with a notch 209 near its inner edge about midway up, the hole being large enough to pass over hose 121 but not large enough to pass the nozzle so that the nozzle 123 can be placed inside the housing and the doors 205 and 207 closed and locked by passing padlock 211 through the hole 16 of lug 14. The padlock itself obstructs the passage of the doors and thus keeps them closed against unauthorized persons.

*Operation*

After the unit is installed upon a prepared mounting slab adjacent the drive way of the bulk station, the suction connection 26 of the unit is connected by piping to a bulk storage tank. The necessary power connection is made and the stair 199 is attached whereupon the unit is ready for service.

The system is capable of operation entirely by the drivers of the transports completely eliminating any bulk plant attendant. The tokens or checks which unlock the system may be purchased at the oil company office or at a bank or other authorized depository.

Various methods may be used for controlling the insertion of tokens into the predeterminer units so that a lower priced token cannot be used in a unit which is intended to receive a token of higher price. The token receiving opening may be fitted with selecting pins as shown in the patent to Ardiff No. 1,995,493 or the opening in the unit on the higher priced products may be made progressively smaller to prevent the insertion of a lower priced token.

The tokens may represent any predetermined gallonage. That is upon the insertion of one token, a fixed gallonage will be dispensed which is a function of the displacement of the meter and the gearing connecting the meter and predeterminer. Usually this is so proportioned that one token will permit the dispensing of 500 gallons of liquid.

A transport truck is driven alongside the dispensing unit. The operator first unlocks lock 211, opens the doors, pulls out on slide 185 to free the switch, then inserts the number of tokens required to fill one or more of the compartments. If he wants more than one grade of fuel, he repeats this operation at the other units through which are dispensed the grades he wants.

He next mounts the platform 7 by way of the stairs 199, resets the register 127 to zero, pulls up the switch pedal 159 thereby closing switch 149 and starting the motor 17 and pump 13. At this time the nozzle 123 is closed and the pump is by-passing. The operator takes the nozzle from hook 124, steps from the deck to the transport catwalk, opens the fill in the top of one of the compartments in the transport, and inserts the nozzle 123 into the fill. He then opens the nozzle valve and holds it open to discharge the quantity desired as shown by the register 127 into the compartment, that is, of course, so long as the desired quantity does not exceed the quantity prepaid by the tokens inserted. Thus, if 3,000 gallons were prepaid, the operator may split the total quantity between the various compartments of the tank in any manner simply by closing the nozzle valve when the first quantity is shown on register 127 and then resetting the register and placing a second quantity in another compartment and so on until the entire credit is exhausted when the pump is automatically stopped.

If two or more grades are desired, they may be loaded at the same time from the dispensers connected to the tanks in which such grades are stored. When the deposited checks in any predeterminer are expended the switch 151 is opened stopping the motor and no more liquid can be dispensed until more checks are deposited into the predetermining device. When the desired quantity of liquid has been delivered the operator closes the nozzle valve and restores the nozzle to the hook. Upon closing and locking the doors, the door strikes slide 185 and turns switch lever 155 to open the switch.

Of course, if the station is operated by an attendant, the loading of the tank truck can be accomplished by prepaying an excess volume of liquid and dispensing it by the nozzle valve by observing the register 127. In this case the motor may be stopped by depressing the plunger 165 and restarted by lifting the plunger as often as desired until the prepaid quantity has been dispensed.

It is obvious that a predetermining mechanism which is manually preset such as that shown in Patent No. 2,228,820 to Griffith et al. may be used with the register 127 or a ticket printer may be substituted for the register 127 and used with or without such manual predeterminer.

The path of the liquid being delivered is through piping 25 and strainer 27, pump 13, piping 29, filter 31 where fine particles of dirt, pipe scale, etc., that may have passed the strainer are removed. Liquid leaves the filter through piping 113, passes to meter 115 where the liquid is measured and thence through piping 117 and check valve 119, hose 121, to nozzle 123.

The meter 115 advances a resettable register 127, or other mechanism by way of the power take off 125 and shaft 129 and decreases the deposited check value in the predetermining device 135 by an amount equal to that dispensed. A flexible shaft and casing 137 connects the check preset predetermining device to the power take off 125.

The filter shown is a cylindrical cartridge type using resin impregnated cellulose cartridges and flow of liquid to be filtered is from the outside in. Gauge 49 in the inlet side of the filter and gauge 48 on the outlet side of the filter are used to determine the differential pressure required to filter the liquid through the cartridges. When the differential pressure rises to a predetermined value to show a plugging of the cartridges, the filter head 45 is removed and the cartridges 41 are replaced.

The air is gravitationally separated from the liquid in the filter tank, the air or gases displaced upon entry of liquid into the filter passes through the valve 50 into the float chamber 85. The liquid rising in the filter tank and starting to escape past the valve 77 closes valve except for the small orifice formed by the mutilation 58 which will permit passage of considerable gas mixed with small amounts of liquid, or, if no gas is present, a small stream of liquid, into the float chamber 85. When the liquid level drops in the filter tank, due to the accumulation of gas, the valve 77 will be opened by the action of spring 81 and will permit a great quantity of gas to be discharged very quickly so that no gas will pass to the meter.

The gas in the float chamber 85 is vented to the atmosphere through the conduit 89, the outlet of which is elevated above the level of the float chamber. The liquid in the float chamber collects until it raises float 97 sufficiently to lift valve 95 off its seat 93, whereupon the liquid in the float chamber is returned to the pump suction through conduit 111. As the liquid level in the float chamber drops the float will follow the seat valve 95.

When desired, the nozzle 123 may be placed inside the housing with the hose extending through the hole 209 in the door 205 and the switch lever 155 locked to hold switch 149 in its open position by pushing in the lever 185. With the doors closed and the padlock 211 inserted through the hole 16 the switch lever 155 is immobilized and the nozzle 123 is locked inside the cabinet.

Steps 199 provide means for the operator to reach the deck 7. The guard rail 201 is so arranged that when the dispensing units are lined up in batteries the rail is practically continuous and the deck plates form a continuous elevated walk so the attendant may use the steps on the end unit to reach any of the units in the battery.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claim.

What I claim to be new and desire to protect by Letters Patent of the United States is:

In a liquid dispensing apparatus, the combination of a frame, a housing supported thereby and comprising an elevated deck and a door on one side, dispensing means disposed within the housing comprising a pump, a motor for the pump and means for energizing and deenergizing the motor, control means extending above the level of the deck for operating said energizing means, and means operable by said door when it is in closed position, for locking said control means against operation.

HOMER R. TALMAGE.

References Cited in the file of this patent
UNITED STATES PATENTS

| Number | Name | Date |
|---|---|---|
| 1,867,602 | Stukenborg | July 19, 1932 |
| 1,872,418 | Davis | Aug. 16, 1932 |
| 2,021,544 | Crown | Nov. 19, 1935 |
| 2,124,681 | Jauch et al. | July 26, 1938 |
| 2,138,755 | Bechtold | Nov. 29, 1938 |
| 2,171,707 | Logan et al. | Sept. 5, 1939 |
| 2,180,619 | Strum | Nov. 21, 1939 |
| 2,186,069 | Hazard | Jan. 9, 1940 |
| 2,223,112 | Lear | Nov. 26, 1940 |
| 2,269,937 | Hart | Jan. 13, 1942 |